United States Patent
Bahrs et al.

(10) Patent No.: US 8,260,642 B2
(45) Date of Patent: Sep. 4, 2012

(54) METHOD AND SYSTEM FOR SCORING AND RANKING A PLURALITY OF RELATIONSHIPS IN COMPONENTS OF SOCIO-TECHNICAL SYSTEM

(75) Inventors: Peter C. Bahrs, Georgetown, TX (US); Murray R. Cantor, Westwood, MA (US); Sunita Chulani, San Jose, CA (US); Kate Ehrlich, Newton, MA (US); Mary E. Helander, North White Plains, NY (US); Sarah C. McAllister, Baton Rouge, LA (US); Giuseppe Valetto, New York, NY (US); Mark N. Wegman, Ossining, NY (US); Clay E. Williams, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1255 days.

(21) Appl. No.: 11/750,734

(22) Filed: May 18, 2007

(65) Prior Publication Data

US 2008/0288587 A1 Nov. 20, 2008

(51) Int. Cl.
*G06Q 10/00* (2012.01)
(52) U.S. Cl. ........................ 705/7.11; 705/319
(58) Field of Classification Search ............... 705/7.11, 705/319
See application file for complete search history.

(56) References Cited

U.S. PATENT DOCUMENTS

| | | | |
|---|---|---|---|
| 5,835,085 A * | 11/1998 | Eick et al. | 715/853 |
| 6,285,999 B1 | 9/2001 | Page | |
| 7,089,252 B2 | 8/2006 | Tomlin et al. | |
| 7,216,088 B1 * | 5/2007 | Chappel et al. | 705/7.17 |
| 2005/0075917 A1* | 4/2005 | Flores et al. | 705/8 |
| 2007/0106780 A1* | 5/2007 | Farnham et al. | 709/223 |
| 2007/0226248 A1* | 9/2007 | Darr | 707/102 |

OTHER PUBLICATIONS

Cleidson de Souza, Jon Froehlich, Paul Dourish, Seeking the source: software source code as a social and technical artifact, Proceedings of the 2005 international ACM SIGGROUP conference on Supporting group work, Nov. 6-9, 2005, Sanibel Island, Florida, USA, pp. 1-10.*
Erik Trainer, Stephen Quirk, Cleidson de Souza, David Redmiles, Bridging the gap between technical and social dependencies with Ariadne, Proceedings of the 2005 OOPSLA workshop on Eclipse technology eXchange, p. 26-30, Oct. 16-17, 2005, San Diego, California, pp. 26-30.*

(Continued)

*Primary Examiner* — Romain Jeanty
*Assistant Examiner* — Timothy Padot
(74) *Attorney, Agent, or Firm* — Scully, Scott, Murphy & Presser, P.C.; Daniel P. Morris, Esq.

(57) ABSTRACT

A method and system for scoring and ranking a plurality of component links in a social technical system having a plurality of components representing people and objects are provided. In one aspect, a degree of consistency relative to two or more people working on one or more objects and dependencies between the objects is determined to derive scores for the component links. The method and system identifies gaps in the link and determines the impact of filling the gaps. In another aspect, component links may be ranked and scores aggregated to provide system level quantifications.

20 Claims, 8 Drawing Sheets

OTHER PUBLICATIONS

Cleidson de Souza, Jon Froehlich, Paul Dourish, Seeking the source: software source code as a social and technical artifact, Proceedings of the 2005 international ACM SIGGROUP conference on Supporting group work, Nov. 6-9, 2005, Sanibel Island, Florida, USA, pp. 1-10.*

Erik Trainer, Stephen Quirk, Cleidson de Souza, David Redmiles, Bridging the gap between technical and social dependencies with Ariadne, Proceedings of the 2005 OOPSLA workshop on Eclipse technology eXchange, p. 26-30, Oct. 16-17, 2005, San Diego, California, pp. 26-30.*

Jill Ritter, Joseph B. Lyons, Stephanie D. Swindler, Large-scale coordination: developing a framework to evaluate socio-technical and collaborative issues. Cognition, Technology & Work. London:Mar. 2007. vol. 9, Iss. 1, p. 33-38 (6 pp.).*

Stein, Eric W., Ph.D., Organizational memory: Socio-technical framework and empirical research. University of Pennsylvania, 1989, 319 pages.*

Cataldo, Marcelo et al., "Identification of Coordination Requirements: Implications for the Design of Collaboration and Awareness Tools", Proceedings of the Conference on Computer Supported Cooperative Work (CSCW'06), Nov. 4-8, 2006, Banff, Alberta, Canada.

Gotel, Orlena et al., "Contribution Structures", 1995.

De Souza, Cleidson et al., "From Technical Dependencies to Social Dependencies", 2004.

* cited by examiner

METHOD AND SYSTEM FOR SCORING AND RANKING A PLURALITY OF RELATIONSHIPS IN COMPONENTS OF SOCIO-TECHNICAL SYSTEM

CROSS-REFERENCE TO RELATED APPLICATIONS

This application is related to U.S. patent application Ser. No. 11/750,763, filed on May 18, 2007, entitled "A Method and System For Understanding Social Organization in a Design and Development Process", and having a common assignee, which application is incorporated by reference herein in its entirety.

FIELD OF THE INVENTION

The present application relates to socio-technical systems in general and, particularly to a method and system for analyzing existing and potential link components in socio-technical systems and measuring the overall consistency, based on a finite set of reference patterns.

BACKGROUND OF THE INVENTION

Socio-technical systems include social structures of actors or people and technical structures of products that people create with their work. A socio-technical software network is a combined model that represents software developers and their relationships, software artifacts (e.g., design documents, packages, modules, classes, methods, error reports, etc.) and their relationships, linkage between developers and artifacts, and their attributes. Analyzing the importance of relationships, more generally known as linkages or links, in the model helps in describing the extent of each link's importance with respect to the overall consistency between the social structure and the technical product structure. The term consistency refers to a more general form of organizational congruence than referred to in e.g., (M. Cataldo, P. A. Wangstrom, J. D. Herbsleb, and K. M. Carley, "Identification of Coordination Requirements: Implications for the Design of Collaboration and Awareness Tools", in Proceedings of the Conference on Computer Supported Cooperative Work (CSCW '06), Banff, Alberta, Canada, Nov. 4-8, 2006, herein referred to as "Cataldo et al.") or (Burton, R. M. and Obel, B. Strategic Organizational Diagnosis and Design. Kluwer Academic Publishers, Norwell, Mass., 1998, herein referred to as "Burton et al."). These measurements can be used for system diagnosis, design and/or organizational optimization. For example, such analysis may be used to determine how well a particular organization is structured to handle a particular project.

The measure of consistency addressed in the present disclosure extends well beyond the notion of congruence, which is a measurement traditionally considered in organizational design, see for example, Burton et al. The notion of consistency is based on a set of identifiable reference patterns within the network model of the social technical system. Note that these patterns are specifically related to recognizable structural aspects of the network, as opposed to organizational patterns (see, for example, "Organizational Patterns of Agile Software Development" by James Coplien and Neil Harrison, Pearson Prentice Hall, 2005). While consistency is a measurement that addresses the alignment of subnetworks that may be organized on different plane, note that it is not network (or graph) comparison of the type in the approach by e.g., "Design Pattern Detection Using Similarity Scoring" by Nikolaos Tsantalis, Alexander Chatzigeorgiou, George Stephanides, and Spyros T. Halkidis, IEEE Transactions On Software Engineering, Vol. 32, No. 11, November 2006.

Measurements may be determined that indicate how much the structure of a development organization mirrors other aspects of the project such as work items assigned to groups and individuals in the organization, and work actually carried out in terms of software components developed by the organization. Known solutions for determining such measurements use non-analytical methods of comparison. Such non-analytical methods of comparison rely on subjective assessments and may be incomplete, and difficult to automate. While a semi-analytical approach is described in Cataldo et al., that methodology uses matrix algebra to compute a congruence metric and concerns tasks, however, but does not address measuring importance of a given link, does not analyze the network directly, and does not analyze components of the work product output by tasks. Further, both non-analytical and semi-analytical methods do not consider detailed structure of the underlying components in the comparison.

Therefore, an improved methodology, for example, which takes into account various attributes and which can be automated is desirable. Further, it is desirable to have such methodology provide measurements that are time phased, for example, to determine how variations of level of such measurements in time within the same project influence performance and quality. It is also desirable to have such methodology provide a measurement of importance at the component (link) level, as well as a consistency measurement at the overall system level.

BRIEF SUMMARY OF THE INVENTION

A method and system for scoring a plurality of component links in a socio technical system are provided. The socio technical system may comprise a plurality of components representing people and objects, the plurality of components links representing a plurality of relationships between the plurality of components. The method in one aspect may comprising determining a measure of consistency relative to a network of people components and a network of object components in a socio technical system, the network of people components including components representing people and one or more links between the components representing people, and the network of object components including components representing objects worked on by at least some of the components representing people and one or more links between the components representing objects. The method may also comprise determining a measure of contribution to the measure of consistency for one or more links between said components, based on presence or absence of said one or more links in the social technical system. The measure of contribution and the measure of consistency can be used for analyzing and structuring work group in a project.

A system for scoring a plurality of component links in a social technical system in one aspect may include means such as computer processor, module, and/or circuitry for providing the functionalities for the above-described method.

Further features as well as the structure and operation of various embodiments are described in detail below with reference to the accompanying drawings. In the drawings, like reference numbers indicate identical or functionally similar elements.

DETAILED DESCRIPTION

A method and system of the present disclosure in one embodiment measures relationships or coordination by comparing an abstract graph model of social structures of people (also referred to as a "social network") with an abstract graph representation of the technical structure of the work product. The comparison is facilitated through the use of "joins" between the two graph that identify connections between node entities in the social graph with node entities in the technical graph. The method and system of the present disclosure in one embodiment considers one or more aspects of mutual existing structural components as well as mutual non-existence of structural components in the resulting metric. The method and system of the present disclosure in one embodiment provides the flexibility for calibrating the measurement to reflect key requirements of measurement interest in the environment and application.

Models of socio-structure and technical-structure and joins are represented electronically. A method and system of the present disclosure in one embodiment automatically computes measurement of relationships joins) from the socio-structure and technical-structure models. For instance, given two graphs and a set of joins between them, a measurement may be provide, for example, on a scale of 0 to 1, to describe how "consistent" they are. Other measurements may include predicting the existence of arcs in a graph that does not have full information.

Figure 1:
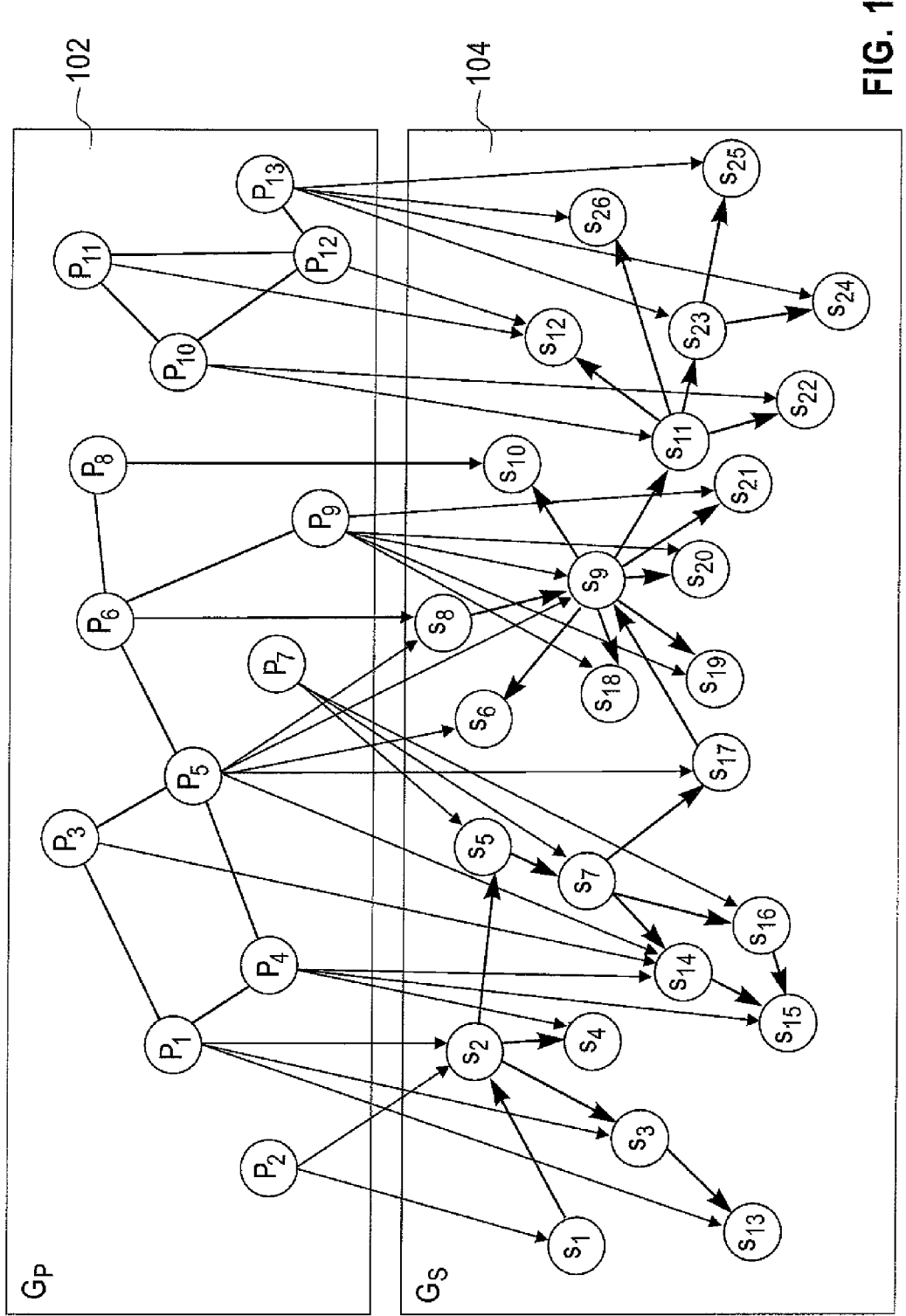
FIG. 1 illustrates an example of a socio-technical system modeled by a network.

FIG. 1 illustrates an example of a socio-technical system modeled as a network. The method and system in one embodiment observes the coordination patterns in the system, and determines and interprets measurements based on the patterns.

The following notation is used by the model:

n:=The number of people involved in the socio-technical system

P:=The set of people, indexed $p_1, p_2, \ldots, p_n$. That is, P={$p_1, p_2, \ldots, p_n$}.

Ep:=The edges between people nodes, i.e., $(p_i, p_j)\epsilon$Ep indicates there is a work relationship between person pi and person pj, where pi, pj$\epsilon$P. Note that in this model, the elements of Ep are unordered pairs. That is $(p_i, p_j)=(p_j, p_i)$.

Gp (P,Ep):=The graph with node set P and link set Ep, representing the social network aspect of the model.

m:=The number of work product artifacts involved in the socio technical system

S:=The set of work product artifacts, indexed $s_1, s_2, \ldots, s_m$. That is, S={$s_1, s_2, \ldots, s_m$}.

As:=The dependencies between work products, i.e., $(s_i, s_j)\epsilon$As indicates there is a dependency by artifact $s_j$ on artifact $s_i$, where $s_i, s_j\epsilon$S.

Gs(S, As):=The graph with node set S and link set As, representing the work product aspect of the model.

J:=The set of "joins" in the socio-technical system. These are directed links from people nodes to work product nodes. That is, (p, s)$\epsilon$J indicates that there is a defined relationship by an assignment of person p$\epsilon$P to work product artifact s$\epsilon$S.

The social network model shown in FIG. 1 is an undirected graph Gp(P,Ep) 102 and the technical artifact dependency model is a directed graph Gs(S, As) 104. However, the method and system of the present disclosure also may be applied to directed graphs for people. Conceptually or logically, the socio plane 102 may include components or nodes representing people and links or relationships between the components or nodes representing people, for example, forming a network of people components. Examples of relationships between people may include but are not limited to communication, trust, organizational connection, etc. The technical plane 104 may include components or nodes representing artifacts or objects worked on by people and dependencies or relationships between the artifacts represented by one or more links, for example, forming a network of object components.

Figure 2:
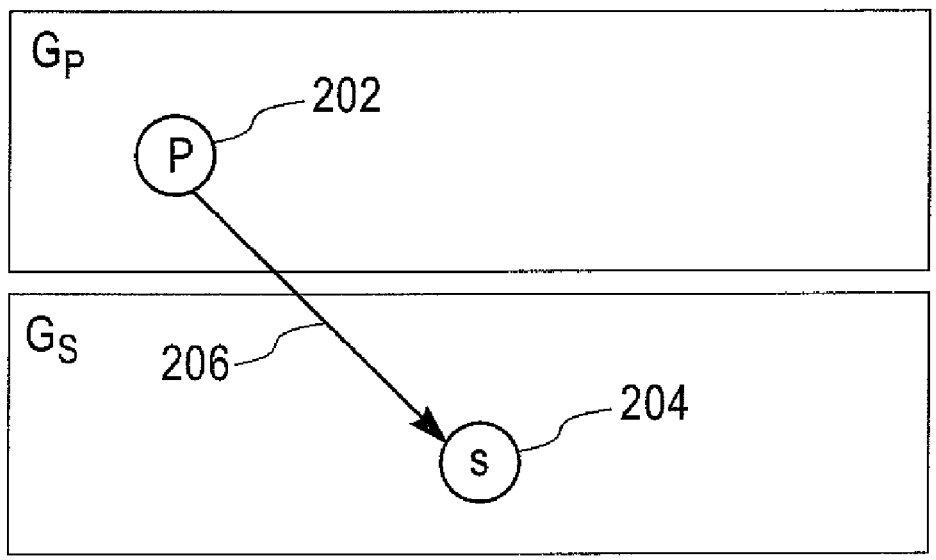
FIG. 2 illustrates null case coordination with respect to a single artifact.

FIG. 2 illustrates null case coordination with respect to a single artifact. That is, the graph shows one person 202 or actor associated with (or working on) 206 one artifact (a product or a component of a product) 204.

Figure 3:
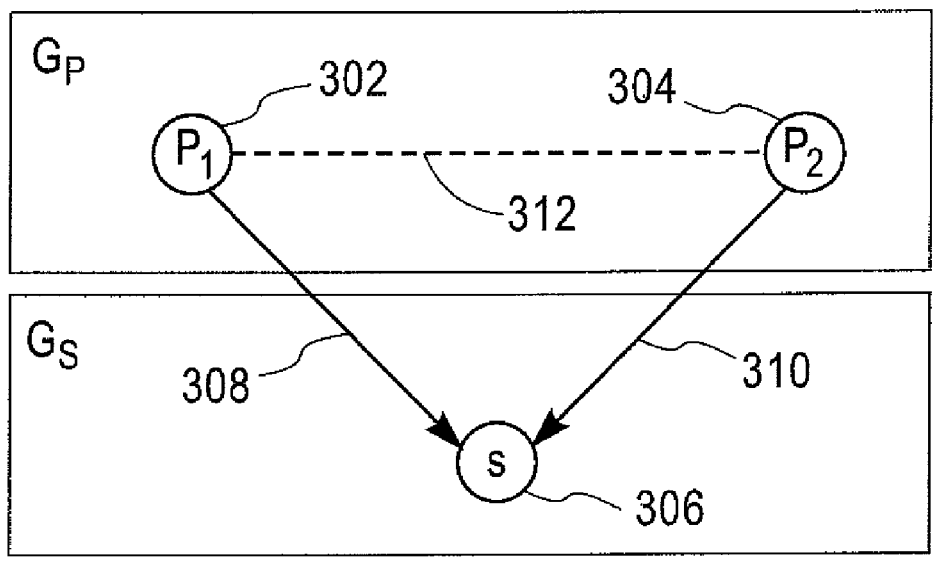
FIG. 3 illustrates direct coordination with respect to a single artifact.

FIG. 3 illustrates direct coordination with respect to a single artifact. When two people are both assigned to the same work artifact, they are expected to coordinate in their communications. FIG. 3 shows an example of a pattern where two people 302, 304 both have a relationship 308, 310 with a common artifact 306 and have a direct coordination link (i.e., path length of one) 312. In one embodiment, the method and system of the present disclosure utilizes graph theory, analyzes the components of the work product, and analyzes and identifies the importance measurements of the links. The components of the work product refers to what is output by tasks, that is, units of work that produce those work products. For example work products may include documents of different type such as requirement specifications, design models, code, etc. Tasks refer to activities such as testing, coding, etc. Thus the present method and system of the present disclosure in one embodiment focuses on and analyzes different kinds of information, other than with respect to the people who look at tasks. Typically, the components of the work product, their relationships and their attributes are "physical" objects, for example, documents that exist persistently and are kept in some repository, and therefore, are easily accessible. Thus, using work components for analysis rather than tasks may provide more accurate results since the tasks are events that may or may not be recorded correctly, depending on the tools and the practices used by the organization that undertakes them, and since it may be more difficult to exhaustively keep track of the tasks that have produced those objects.

Figure 4:
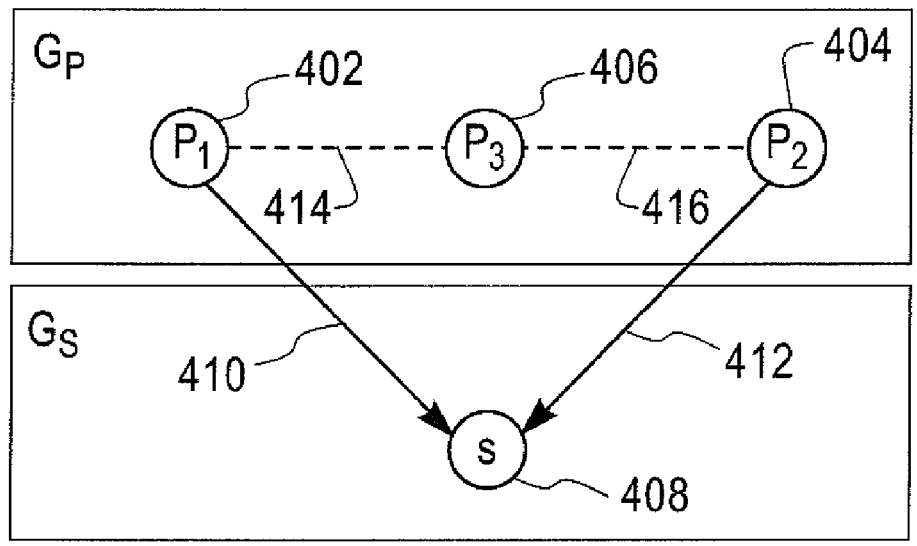
FIG. 4 illustrates indirect coordination having path length two with respect to a single artifact.

FIG. 4 illustrates indirect coordination having path length two with respect to a single artifact. When two people are both assigned to the same work artifact, it is expected that they coordinate in their communications. If this does not occur directly, it may be accomplished through an intermediary. FIG. 4 shows an example of a pattern where two people 402, 404 both have a relationship 410, 412 with a common artifact 408, and have an indirect coordination link of path length two 414 and 416 via another person 406.

Figure 5:
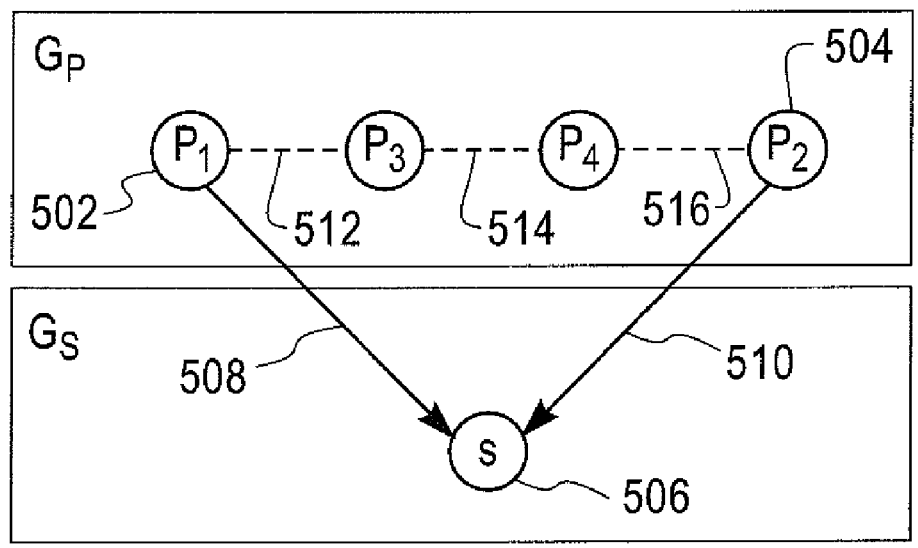
FIG. 5 illustrates indirect coordination having path length tree with respect to a single artifact.

FIG. 5 illustrates indirect coordination having path length tree with respect to a single artifact. When two people are both assigned to the same work artifact, they are expected to coordinate in their communications. If this does not occur directly, it may be accomplished through a series of connected intermediaries. FIG. 5 shows an example of a pattern where two people 502, 504 both have a relationship 508, 510 with a common artifact 506, and have an indirect coordination link of path length three 512, 514, and 516.

Figure 12:
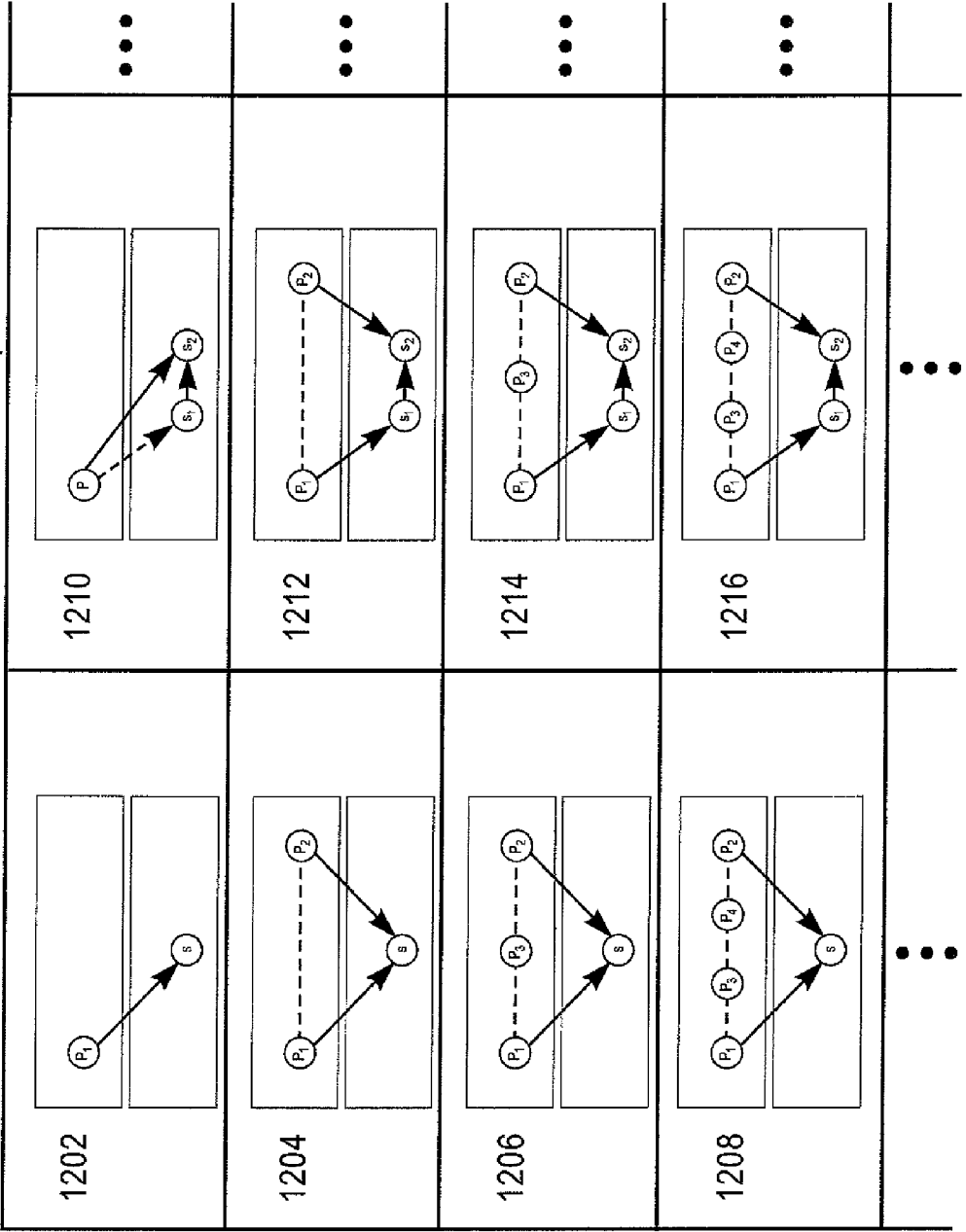
FIG. 12 illustrates an example set of reference patterns, relating to coordination, collaboration patterns and anti-patterns.

FIGS. 2-5 illustrate examples of the "node tie" reference pattern. For example, when two or more people are each involved with a common artifact, the method and system of the present disclosure expect to observe "coordination" via a communication link. This coordination is referred to as collaboration. It is possible to have longer path lengths, for example, 4, 5, 6, etc. up to the length equal to number of people in the graph P minus one. For example, the longest path length, without repeating nodes, in a network is the number of nodes minus one. FIG. 12 illustrates an example set of reference patterns. Collaboration patterns 1204, 1206, 1208 may exist between people nodes working on a common artifact directly or indirectly via one or multiple paths. Note that anti-patterns are indicated when the dotted line is absent.

Figure 6:
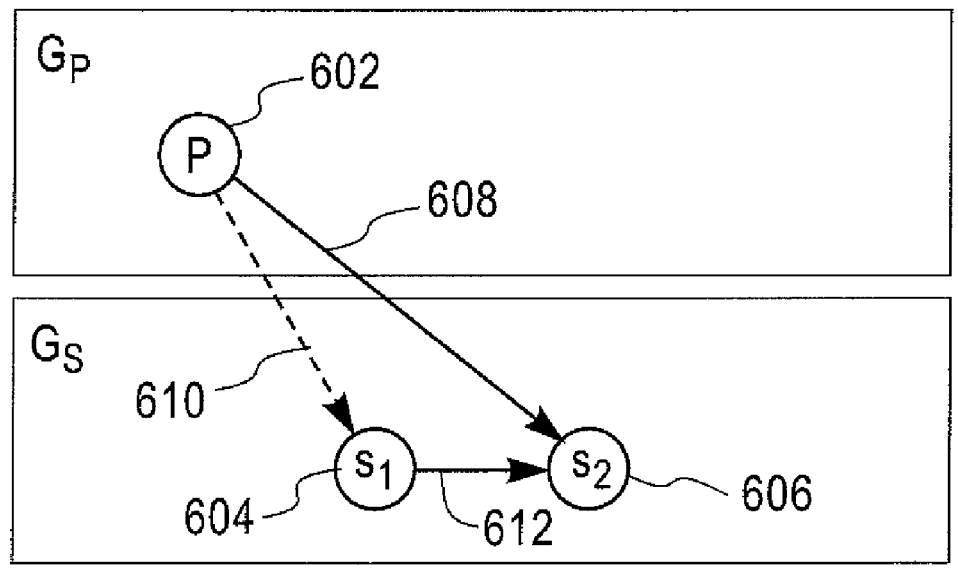
FIG. 6 illustrates singular coordination with respect to dependent artifacts.

FIG. 6 illustrates singular coordination with respect to dependent artifacts. Suppose work artifact s(r) has a dependency on work artifact s(q). Furthermore, suppose that person p has an assigned role with artifact s(r), but no relationships with anyone who has an assigned role with work artifact s(q). Then it is expected that person p has some assigned role to artifact s(q), so that p would have detailed working knowledge of the dependency of s(r) on s(q). FIG. 6 shows an example of a pattern where one person 602 has a relationship 608, 610 with two artifacts 604, 606 where one is dependent on the other shown by link 612.

Figure 7:
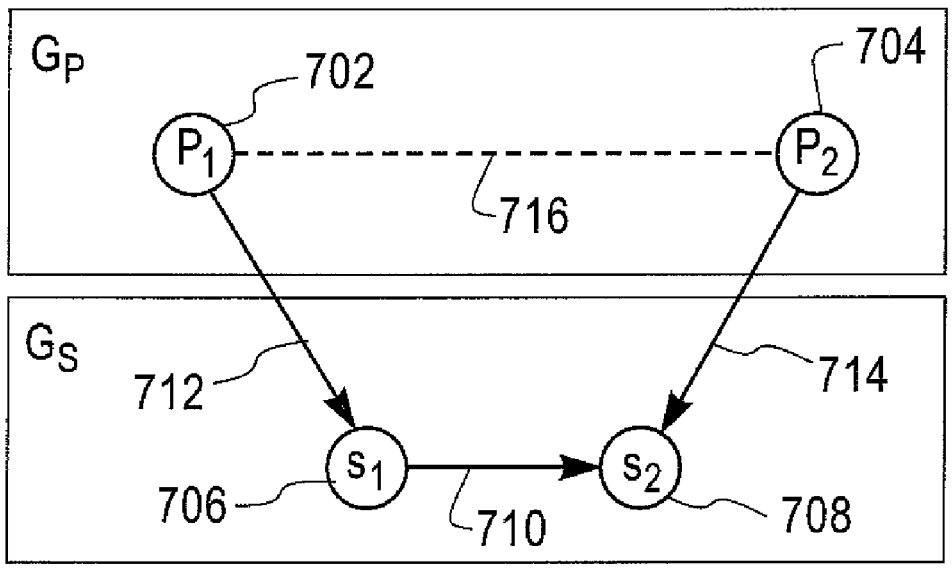
FIG. 7 illustrates direct coordination with respect to dependent artifacts.

FIG. 7 illustrates direct coordination with respect to dependent artifacts. Suppose work artifact s(r) has a dependency on work artifact s(q). Furthermore, suppose that person p(i) has an assigned role with artifact s(r), but no assigned role with s(q). Person p(j), however, does have an assigned role with artifact s(q). Then it is expected that persons p(i) and p(j) to have a working relationship so that they are coordinated. FIG. 7 shows an example of a pattern where two people 702, 704 each have a relationship 712, 714 respectively, with an artifact 706, 708 respectively, where the artifacts 706, 708 which share a direct (i.e., path length one) dependency 710. Expected relationship between the two persons 702, 704 is shown by the link at 716.

Figure 8:
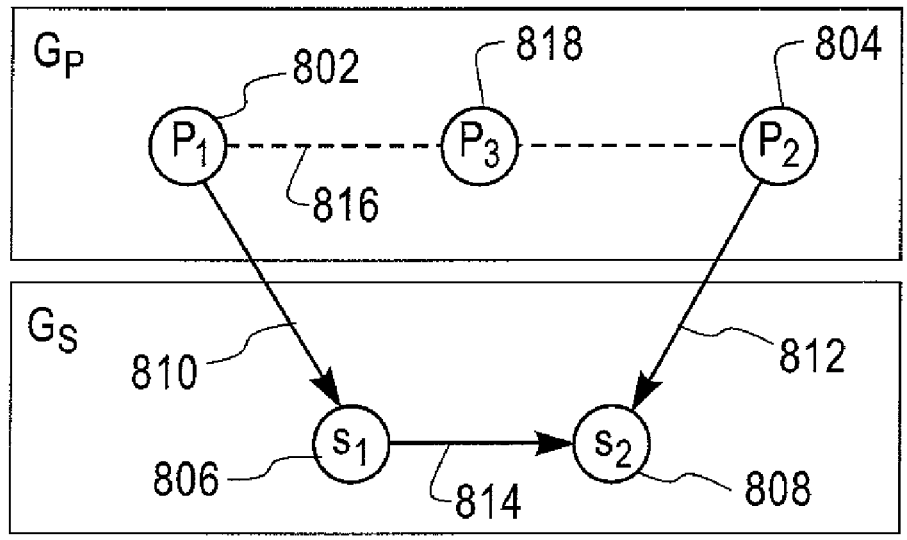
FIG. 8 illustrates indirect coordination, path length two, with respect to dependent artifacts.

FIG. 8 illustrates indirect coordination, path length two, with respect to dependent artifacts. When two people are assigned to artifacts that share a dependency, it is expected that the two people to be coordinated in their communications. If this does not occur directly, it may be accomplished through an intermediary. FIG. 8 shows an example of a pattern where two people 802, 804 each have a relationship with an artifact 806, 808 respectively, where the artifacts 806, 808 are distinct but are independent and the people have an indirect (i.e. path length two) relationship 816, 818.

Figure 9:
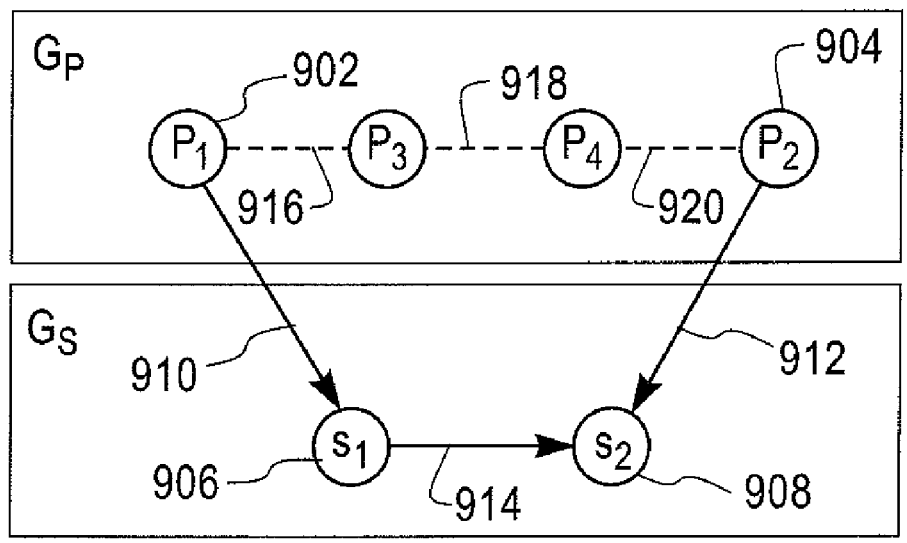
FIG. 9 illustrates indirect coordination, path length three, with respect to dependent artifacts.

FIG. 9 illustrates indirect coordination, path length three, with respect to dependent artifacts. The example pattern shows two people 902, 904 having relationship 910, 912 respectively with an artifact 906, 908 respectively, where the artifacts 906, 908 share an indirect (i.e., path length three) dependency 914. Expected relationship between the two persons 902, 904 is shown by the links at 916, 918, and 920.

FIGS. 6-9 illustrate examples of the "arc mirroring" reference pattern. For example, when two or more people are each involved with a different artifact and there is a dependency between the artifacts, the method and system of the present disclosure expect to observe "coordination" via a communication link also between the people. This network of coordination is referred to as coordination patterns In addition to the examples shown, there may exist path lengths of greater than three between pairs of people, for instance, up to the length equal to number of people in the graph P minus one. Without repeating nodes, the longest path length in a network is the number of nodes minus one. FIG. 12 illustrates an example set of reference patterns. Coordination patterns 1212, 1214, 1216 may exist between people nodes working on related software artifacts directly or indirectly via one or multiple paths.

Node tie collaboration consistency refers to a case whenever a pair of individuals (people) both have a relationship with a work artifact, then one expects to see a path between the people in the social network. This can be expressed conceptually as follows. Define $\Gamma_s(G_S, G_P, J, 1)$ to be the number of times that there exist $s_0 \in S$ and $p_i, p_j \in P$, with $i \neq j$, such that $(p_i, s_0), (p_j, s_0) \in J$. For any natural number $k >= 2$, let $\Gamma_s(G_S, G_P, J, k)$ denote the number of times that there exist $s_0 \in S$ and $p_i, p_j \in P$, with $i \neq j$, such that $(p_i, s_0), (p_j, s_0) \in J$ and there is no geodesic (i.e. a shortest path between a pair of nodes, where the path length is measured by the number of links) from $p_i$ to $p_j$ of length less than or equal to $k-1$. Similarly, define $\Lambda_s(G_S, G_P, J, 1)$ is defined to be the number of times that there exist $s_0 \in S$ and $p_i, p_j \in P$, with $i \neq j$, such that $(p_i, s_0), (p_j, s_0) \in J$ and $(p_i, p_j) \in E_P$. For $k >= 2$, let $\Lambda_s(G_S, G_P, J, k)$ denote the number of times that there exist $s_0 \in S$ and $p_i, p_j \in P$, with $i \neq j$, such that $(p_i, s_0), (p_j, s_0) \in J$ and there is a geodesic from $p_i$ to $p_j$ of length less than or equal to $k$. Then for all nonzero natural numbers $k$, define the k-path collaboration (on a single artifact) pattern consistency by the ratio $$\rho_{s,k} := \frac{\Lambda_s(G_S, G_P, J, k)}{\Gamma_s(G_S, G_P, J, k)}.$$

Define $\rho_{s,0} := 0$.

Arc mirroring coordination consistency refers to the following: if work artifact $s_r$ has a dependency on work artifact $s_q$, then one expects person $p_j$ to be connected to artifact $s_q$ either directly or via a path in the people graph by $Gp(P, Ep)$. This concept can be expressed formally as follows. Define $\Gamma_d(G_S, G_P, J, 0)$ to be the number of times that there exist $s_q, s_r \in S$, $q \neq r$, and $p_j \in P$ such that $(s_q, s_r) \in A_S$ and $(p_j, s_r) \in J$. Define $\Gamma_d(G_S, G_P, J, 1)$ to be the number of times that there exist $s_q, s_r \in S$, $q \neq r$, and $p_i, p_j \in P$, $i \neq j$, such that $(s_q, s_r) \in A_S$ and $(p_i, s_q), (p_j, s_r) \in J$. For any natural number $k >= 2$, let $\Gamma_d(G_S, G_P, J, k)$ denote the number of times that there exist $s_q, s_r \in S$, $q \neq r$, and $p_i, p_j \in P$, $i \neq j$, such that $(s_q, s_r) \in A_S$ and $(p_i, s_q), (p_j, s_r) \in J$ and there is no geodesic from $p_i$ to $p_j$ of length less than or equal to $k-1$.

Similarly, define $\Lambda_d(G_S, G_P, J, 0)$ to be the number of times that there exist $s_q, s_r \in S$, $q \neq r$, and $p_j \in P$ such that $(s_q, s_r) \in A_S$ and $(p_j, s_r) \in J$. Define $\Lambda_d(G_S, G_P, J, 1)$ to be the number of times that there exist $s_q, s_r \in S$, $q \neq r$, and $p_i, p_j \in P$, $i \neq j$, such that $(s_q, s_r) \in A_S$ and $(p_i, s_q), (p_j, s_r) \in J$ and $(p_i, p_j) \in E_P$. For $k >= 2$, let $\Lambda_d(G_S, G_P, J, k)$ denote the number of times that there exist $s_q, s_r \in S$, $q \neq r$, and $p_i, p_j \in P$, $i \neq j$, such that $(s_q, s_r) \in A_S$ and $(p_i, s_q), (p_j, s_r) \in J$ and there is a geodesic from $p_i$ to $p_j$ of length $k$. Then for all nonzero natural number k, define the k-path coordination (on a pair of dependent artifacts) pattern consistency by the ratio $$\rho_{d,k} := \frac{\Lambda_d(G_S, G_P, J, k)}{\Gamma_d(G_S, G_P, J, k)}.$$

Note that $\rho_{I,k}$ (i.e., $\rho_{d,k}$ where d is equal to 1) is equivalent to the value of the "congruence" metric in Cataldo et al. under certain assumptions.

The method and system also may aggregate the individual pattern consistency metrics $\rho_{s,k}$ and $\rho_{d,k}$ into organizational consistency metrics $\Omega_s$ and $\Omega_d$. Observe that for any given socio-technical network with a people node set of size n, the maximum length of any path in the people graph Gp(P, Ep) is given by n−1. Therefore, the pattern consistency metrics $\rho_{s,k}$ and $\rho_{d,k}$ only make sense for k=0, 1, 2, . . . , n−1. Let $\{\lambda_k, k=0, 1, 2, \ldots, n-1\}$ be any finite, nonnegative, non-increasing sequence such that $$\sum_{k=1}^{n-1} \lambda_k = 1.$$

Then organizational collaboration consistency (node tie) metric may be defined in the following way:

$$\Omega_s := \rho_{s,1} + \sum_{k=2}^{n-1} \lambda_k \rho_{s,k} \prod_{j=1}^{k-1}(1 - \rho_{s,j}).$$

Likewise, organization coordination consistency (arc mirroring) metric may be defined as follows:

$$\Omega_d := \rho_{d,1} + \sum_{k=2}^{n-1} \lambda_k \rho_{d,k} \prod_{j=1}^{k-1}(1 - \rho_{d,j}).$$

EXAMPLES

Geometric series: Let 0<r<1 and define $\lambda_k := cr^k$, where $$c := \frac{1-r}{1-r^n}.$$

Power series: For any natural number p=1, 2, . . . , let $$H := \sum_{k=0}^{n-1} \frac{1}{(k+1)^p}$$

and define $$\lambda_k := \frac{1}{H(K+1)^p}.$$

Function-based series: Let $f:[0,\infty) \to (0,\infty)$ be a decreasing function. Let $$c := \sum_{k=0}^{n-1} f(k)$$

and define $$\lambda_k := \frac{f(k)}{c}.$$

Then one may choose a specific function $f$ according to specific requirements. For example, one may choose $f(x) = e^{-zx^2}$, where z>0 is any positive rational parameter.

The choice of the parameters r (geometric series), p (power series) or z (exponential function based series) may affect how quickly the organizational consistency parameters $\lambda_k$ tend to zero. This choice may also affect how much weight is given to the first pattern consistency metric $\rho_{*,1}$ (here * represents either s or d).

Recommended default parameters are r=0.75, p=1 and z=0.05. These default settings yield similar results in the combined organizational consistency metrics for each choice of series type.

Figure 10:
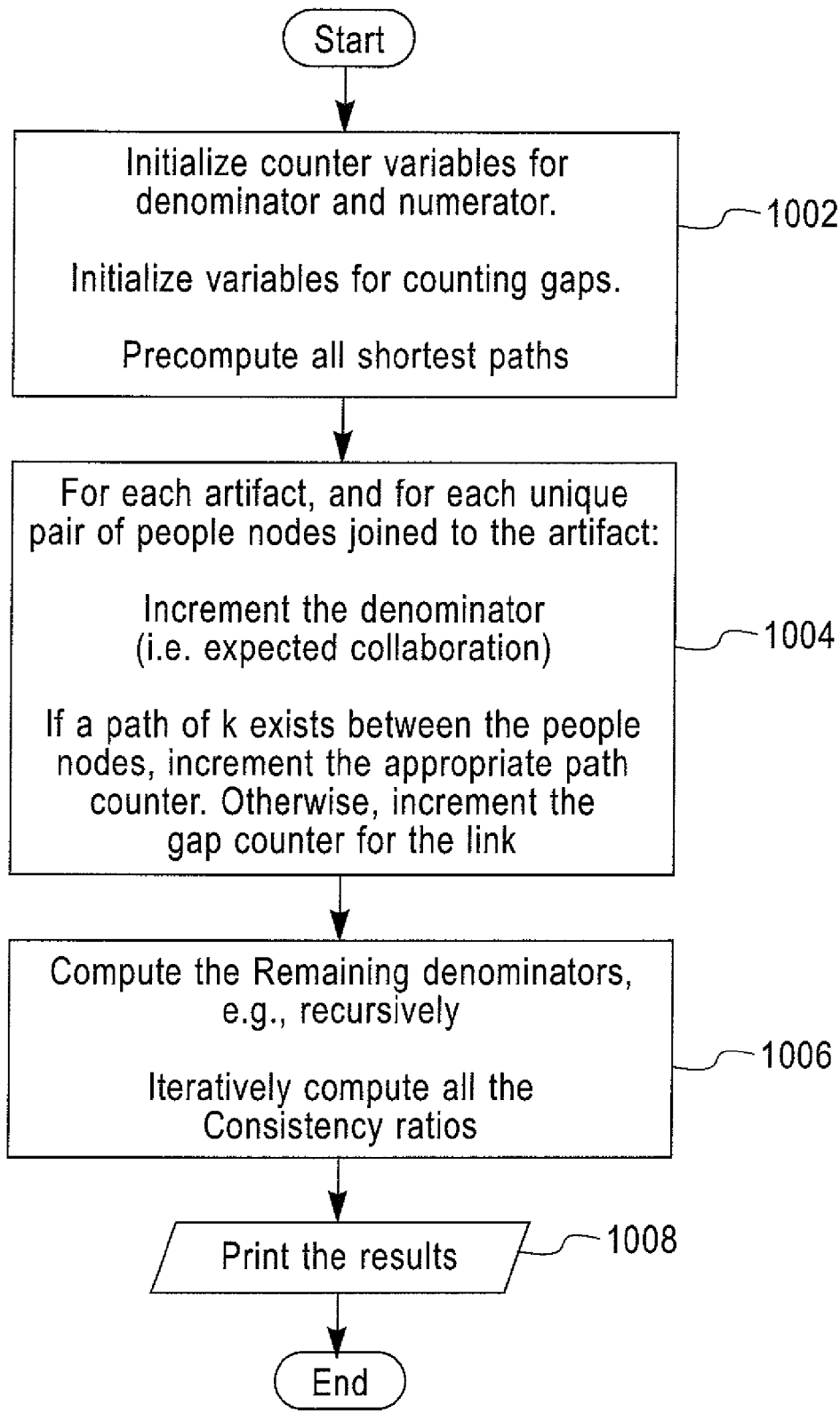
FIG. 10 is a flow diagram illustrating a method of the present disclosure in one embodiment for finding measurements related to collaboration patterns.

FIG. 10 illustrates a method in one embodiment of the present disclosure for finding measurements related to collaboration patterns. At 1002, initialization takes place. For example, counter variables for expected collaboration pattern (denominator in a ratio expression) and observed pattern (numerator in the ratio expression) are initialized, variables for counting gaps are initialized, and all shortest paths are computed. At 1004, for each artifact and for each unique pair of people nodes joined to the artifact, a counter for the expected collaboration pattern is incremented. If a path of k exists between the people nodes, appropriate path counter is incremented, otherwise the gap counter for the link is incremented. At 1006, the remaining denominators are computed, for example, recursively, and consistency ratios are computed iteratively. At 1008, the results are presented.

The following illustrates an algorithm in one embodiment that finds all consistency ratios, $\rho_{s,k}$, in which $\delta_{s,k}$ represents expected collaboration pattern and $\lambda_{s,k}$ represents observed collaboration pattern:

Step 1: For k=1,...,$n_p$−1 (where $n_p$−1 is the maximum geodesic
 in a network with $n_p$ nodes, where $n_p$ represents the number of people
 in the socio technical system being considered):
  { Set $\delta_{s,k}$ = 0 and $\lambda_{s,k}$=0 }
Step 2: Precompute all node to node geodesic distances:
  gdes($p_i,p_j$) for all $p_i$, $p_j \in$ P
Step 3:
 For each vertex $s_0 \in$ S:
  {
   Let $J_{s0}$=the set of all joins from set J incident on vertex $s_0$.
   For each unique pair in $J_{s0}$,
   i.e. ($p_i$, $s_0$) , ($p_j$, $s_0$) $\in J_{s0}$ where $p_i \neq p_j$:
    {
     Set $\delta_{s,1}$ = $\delta_{s,1}$ + 1
     Set v = gdes($p_i,p_j$)
     If (v < +∞)
      { $\lambda_{s,v}$= $\lambda_{s,v}$ +1 }
     else
      { a gap is identified at ($p_i$, $p_j$). }
    }
  }

-continued

Step 4: For h=2,...,$n_p$-1:
    { Set $\delta_{s,h} = \delta_{s,h-1} - \lambda_{s,h-1}$ }
Step 5: For k=1,...,$n_p$-1:
    { Set $\rho_{s,k} = \lambda_{s,k} / \delta_{s,k}$ }
End The above algorithm simultaneously computes all k-path collaboration pattern consistency ratios, and identifies gaps. Since the maximum path length in a network with $n_p$ nodes is $n_{p-1}$, it starts by initializing to zero the counters used to find the denominator and numerator values respectively. The $2^{nd}$ step finds all point to point geodesic (shortest path based on number of links) values. This step can be accomplished by iterating a standard shortest path algorithm such as those known by Dijkstra, or Floyd Warshall. Step 3 iterates by considering each artifact node and all of the joins (i.e., links emanating from the people nodes into the artifact nodes) that connect to it. For each unique pair of joins linked into a common artifact, the algorithm looks to see if there are two distinct individuals at the other ends of the join pair, and if there is, the denominator is incremented. If there is also a path between these two distinct individuals, then the appropriate numerator counter is incremented. During the main step, whenever there is no path between a pair of nodes for which the method and system expect to see communication, a gap is noted. These gaps are useful to derive the importance values of the individual links—i.e. how much the overall collaboration would be improved by adding the link. After step 3, step 4 computes the remaining denominator values by recursion. This works because, between any pair of nodes, if there is a path, it is either of length 1, 2, . . . , or $n_{p-1}$ in length. In step 5, the ratios are computed—that is, the number of observed patterns are divided by the number of patterns expected for perfect collaboration interaction.

Figure 11:
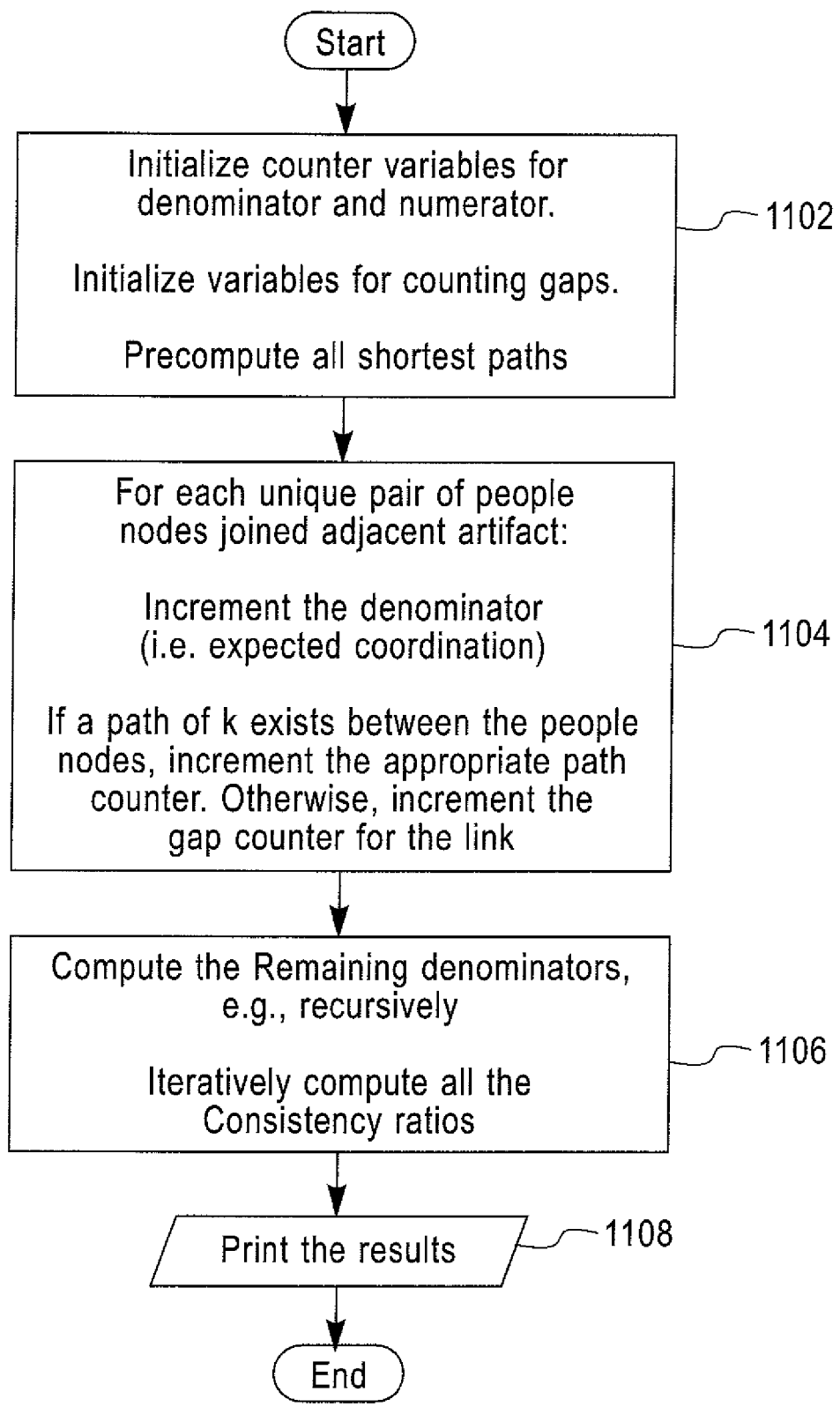
FIG. 11 is a flow diagram illustrating a method in one embodiment for finding measurements related to coordination patterns.

FIG. 11 illustrates a method in one embodiment for finding measurements related to coordination patterns. At 1102, counter variables are initialized for expected and observed coordination patterns, and for determining gaps. All shortest paths between nodes in the people network are computed. At 1104, for each unique pair of people nodes joined to adjacent artifacts or linked artifacts, increment the denominator (number of expected coordination in this example). If a path of k exists between the people nodes, increment the appropriate path counter (observed coordination pattern), otherwise increment the gap counter for the link. At 1106, the remaining denominators are computed, e.g., recursively, and the corresponding consistency ratios are iteratively computed. At 1108, the results are presented.

The following illustrates an algorithm in one embodiment that finds all consistency ratios, $\rho_{d,k}$, in which $\delta_{d,k}$ represents expected coordination pattern and $\lambda_{d,k}$ represents observed coordination pattern:

Step 1: For k=1,...,$n_p$-1 :
    { Set $\delta_{d,k}$ = 0 and $\lambda_{d,k}$=0 }
Step 2: Precompute all node to node geodesic distances:
    gdes($p_i,p_j$) for all $p_i$, $p_j \in P$
Step 3:
    For each link ($s_0$, $s_1$) $\in A_s$:
    {
    Let $J_{s0}$=the set of all joins from set J incident on vertex $s_0$.
    Let $J_{s1}$=the set of all joins from set J incident on vertex $s_1$.
    For each unique pair in $J_{s0} \times J_{s1}$,
    i.e. ($p_i$, $s_0$) , ($p_j$, $s_1$) $\in J_{s0}$ where $p_i \neq p_j$:
    {

-continued

Set $\delta_{d,1} = \delta_{d,1}$+1
    Set v = gdes($p_i,p_j$)
    If (v < + ∞)
        { $\lambda_{d,v} = \lambda_{d,v}$ +1 }
    else
        { a gap is identified at ($p_i$, $p_j$) }
    }
}
Step 4: For h=2,...,$n_p$-1:
    { Set $\delta_{d,h} = \delta_{d,h-1} - \lambda_{d,h-1}$ }
Step 5: For k=1,...,$n_p$-1 :
    { Set $\rho_{d,k} = \lambda_{d,k} / \delta_{d,k}$ }
End The algorithm above works in the similar way as the previous algorithm, except that in step 3 step, it iterates by considering each link between pairs of software artifact nodes and then each unique pair of joins where one is connected to one of the software artifact nodes and one to the other. Both algorithms perform in polynomial time.

As described above, consistency is measured between conceptual planes in the socio-technical system. For example, in FIG. 1, consistency may be measure between the planes 102 and 104. Each plane comprises a collection of relationships, or links, between nodes or components, or people or objects. Consistency does not necessarily mean matching. That is, consistency does not necessarily mean that the networks or the planes are identical in structure. Two or more networks can be consistent while not matching exactly. For instance, one plane may be much larger and denser than the other, and they still may be consistent.

The following illustrates a way to derive link importance measurements for links. Links that are not in the graph are also referred to as potential links in the present disclosure. These links may include between people, artifacts, or new joins, or any other links between and among components of socio-technical system being considered. Link importance measurements are also referred to as scores, that is, the degree to which a link or a potential link contributes to the overall consistency measurement. The determined scores then may be ordered to provide a ranking among the links.

Path collaboration (on a single artifact) pattern consistency and the k-path coordination (on a pair of dependent artifacts) pattern consistency (for example, each mathematically described by the ratios defined, as well as computationally described by the algorithms, above) provide measurements, both in their individual and weighted combinations, that are attributes of the socio-technical system as a whole. Each measurement may take on a value between zero and one, and can be interpreted as a degree to which the socio-technical system is consistent. That is, a value of zero indicates no consistency, a value of one indicates complete consistency, and a value of u where 0<u<1 (i.e. u is greater than zero as well as less than one) can be interpreted as the percentage of consistency achieved. For instance, a socio-technical system can be considered to have a socio part comprising people and technical part comprising objects, although not limited to such, and consistency may be considered as a measurement relative to the comparison of the parts. It is also possible to have a socio-technical system with additional parts.

For some socio technical systems, a higher consistency measurement (e.g., close to or equal to the value of one) may be considered better than a lower measurement. For example, in an organization working on a common set of goals, high degree of communication or relationship may be considered valuable to the workings of the organization. In other socio-technical systems, a lower measurement (e.g., close to or equal to the value of zero) may be considered more desirable. For example, consider a supply chain used to create IEDs (improvised explosive devices) by a group of terrorists. This may be modeled as a socio-technical system, in which it is preferred to see or drive the system to a low consistency measurement, signifying disruption in the effort.

Related to each component link is a value, referred in this disclosure as a "score" or "importance value," which measures the contribution by the link to the overall consistency. Note that a component link's score may be influenced by its inclusion (or not) in observed reference patterns. For example, a score may be higher if a component link is observed to connect two people who both happen to work on more than one of the same artifacts. A score may also be higher on a link between two people who happen to work on many different artifacts where the different artifacts have a number of dependencies between them.

In one embodiment, a score given to a component link may be derived by computing a system-wide consistency measurement twice: once with and once without the link. On the other hand, general analytical forms for the score of a component link (be it a component link between people, a link between software artifacts, or a link joining a person and an artifact, or any other joins) can be written in terms of the same notation given above. For example, the following derives several views of importance measurements (or scores) for the different types of links in one embodiment of the present disclosure. The derivations described below is shown as examples only. Other derivation methods may be used.

The following describes the importance or impact of introducing a link between people in a social-technical network in detail in one embodiment. Suppose that $i \neq j$ and $(p_i, p_j) \notin E_P$. One may socially engineer the socio-technical network by introducing person $p_i$ and $p_j$ to one another. This corresponds to adjoining edge $(p_i, p_j)$ to the people graph $G_P$. Let $G_P(p_i, p_j)$ be the graph obtained by adjoining edge $(p_i, p_j)$ to $G_P$. It is desired to measure the impact that adding edge $(p_i, p_j)$ to $G_P$ would have on the 1-path collaboration consistency pattern measure $\rho_{s,l}$ and the 1-path coordination measure $\rho_{d,l}$.

Recall that by collaboration consistency the following is meant: whenever a pair of individuals (people) both have a relationship with a work artifact, then one expects to see a path between the people in the social network. Recall that $\Gamma_s(G_S, G_P, J, 1)$ is defined to be the number of times that there exist $s_0 \in S$ and $p_i, p_j \in P$, with $i \neq j$, such that $(p_i, s_0), (p_j, s_0) \in J$. Moreover, $\Lambda_s(G_S, G_P, J, 1)$ is defined to be the number of times that there exist $s_0 \in S$ and $p_i, p_j \in P$, with $i \neq j$, such that $(p_i, s_0), (p_j, s_0) \in J$ and $(p_i, p_j) \in E_P$. The 1-path collaboration consistency measure is given by $$\rho_{s,1} := \frac{\Lambda_s(G_S, G_P, J, 1)}{\Gamma_s(G_S, G_P, J, 1)}.$$

Now suppose that there exists $s_0 \in S$ such that $(p_i, s_0), (p_j, s_0) \in J$. Then $$\Gamma_s(G_S, G_P(p_i, p_j), J, 1) = \Gamma_s(G_S, G_P, J, 1)$$

and $$\Lambda_s(G_S, G_P(p_i, p_j), J, 1) = \Lambda_s(G_S, G_P, J, 1) + 1.$$

Therefore the net impact of adding the edge $(p_i, p_j)$ to $G_P$ is given by $$\frac{\Lambda_s(G_S, G_P, J, 1) + 1}{\Gamma_s(G_S, G_P, J, 1)} - \frac{\Lambda_s(G_S, G_P, J, 1)}{\Gamma_s(G_S, G_P, J, 1)} = \frac{1}{\Gamma_s(G_S, G_P, J, 1)}.$$

On the other hand, if $(p_i, p_j) \notin E_P$ and there does not exist $s_0 \in S$ such that $(p_i, s_0), (p_j, s_0) \in J$, then $$\Lambda_s(G_S, G_P(p_i, p_j), J, 1) = \Lambda_s(G_S, G_P, J, 1)$$

and $$\Gamma_s(G_S, G_P(p_i, p_j), J, 1) = \Gamma_s(G_S, G_P, J, 1)$$

so the net impact of adding the edge $(p_i, p_j)$ to $G_P$ is 0. In other words, there is net impact on $\rho_{s,l}$ of adding edge $$(p_i, p_j) = \begin{cases} \frac{1}{\Gamma_s(G_S, G_P, J, 1)} \\ 0 \end{cases}$$

if there exists $s_0 \in S$ such that $(p_i, s_0), (p_j, s_0) \in J$, 0 otherwise.

Recall that by coordination consistency the following is meant: if work artifact $s_r$ has a dependency on work artifact $s_q$, and if person $p_j$ is connected to artifact $s_r$, then one expects person $p_i$ to be connected to artifact $s_q$. Recall that $\delta_s(G_S, G_P, J, 1)$ is defined to be the number of times that there exist $s_q, s_r \in S$, $q \neq r$, and $p_i, p_j \in P$, $i \neq j$, such that $(s_q, s_r) \in A_S$, and $(p_i, s_q), (p_j, s_r) \in J$. Moreover, $\Lambda_d(G_S, G_P, J, 1)$ is defined to be the number of times that there exist $s_q, s_r \in S$, $q \neq r$, and $p_i, p_j \in P$, $i \neq j$, such that $(s_q, s_r) \in A_S$ and $(p_i, s_q), (p_j, s_r) \in J$ and $(p_i, p_j) \in E_P$. The 1-path coordination consistency measure is given by $$\rho_{d,1} := \frac{\Lambda_d(G_S, G_P, J, 1)}{\Gamma_d(G_S, G_P, J, 1)}.$$

Continue to suppose that $i \neq j$ and $(p_i, p_j) \notin E_P$. Now consider the impact that adding edge $(p_i, p_j)$ would now have on the consistency pattern measure $\rho_{d,l}$. As before, let $G_P(p_i, p_j)$ be the graph obtained by adjourning edge $(p_i, p_j)$ to $G_P$. Now suppose that there exist $s_q, s_r \in S$, $q \neq r$ such that $(s_q, s_r) \in A_S$ and $(p_i, s_q), (p_j, s_r) \in J$. Then $\Gamma_d(G_S, G_P(p_i, p_j), J, 1) = \Gamma_d(G_S, G_P, J, 1)$ and $\Lambda_d(G_S, G_P(p_i, p_j), J, 1) = \Lambda_d(G_S, G_P, J, 1) + 1$. Therefore the net impact of adding the edge $(p_i, p_j)$ to $G_P$ is given by $$\frac{\Lambda_d(G_S, G_P, J, 1) + 1}{\Gamma_d(G_S, G_P, J, 1)} - \frac{\Lambda_d(G_S, G_P, J, 1)}{\Gamma_d(G_S, G_P, J, 1)} = \frac{1}{\Gamma_d(G_S, G_P, J, 1)}.$$

On the other hand, if $(p_i, p_j) \notin E_P$ and there does not exist $s_q, s_r \in S$, $q \neq r$ such that $(s_q, s_r) \in A_S$ and $(p_i, s_q), (p_j, s_r) \in J$, then $\Lambda_d(G_S, G_P(p_i, p_j), J, 1) = \Lambda_d(G_S, G_P, J, 1)$ and $\Gamma_d(G_S, G_P(p_i, p_j), J, 1) = \Gamma_d(G_S, G_P, J, 1)$ so the net impact of adding the edge $(p_i, p_j)$ to $G_P$ is 0.

In other words, there is net impact on $\rho_{s,l}$ of adding edge if $$(p_i, p_j) = \begin{cases} \frac{1}{\Gamma_d(G_S, G_P, J, 1)} \\ 0 \end{cases}$$

there exists $s_0 \in S$, $q \neq r$ such that $(s_q, s_r) \in A_S$ and $(p_i, s_q), (p_j, s_r) \in J$, 0 otherwise.

The following describes the importance or impact of assigning new joins in a socio-technical network in detail in one embodiment. Suppose that $(p_0, s_0) \notin J$. One may engineer the socio-technical network by assigning person $p_0$ to task $s_0$. This corresponds to adjoining arc $(p_0, s_0)$ to the join set J. Let $J(p_0, s_0)$ be the graph obtained by adjoining arc $(p_0, s_0)$ to J. It is desirable to measure the impact that adding arc $(p_0, s_0)$ to J would have on the 1-path collaboration consistency pattern measure $\rho_{s,l}$ and the 1-path coordination consistency measure $\rho_{d,l}$.

Recall that by collaboration consistency the following is meant: whenever a pair of individuals (people) both have a relationship with a work artifact, then one expects to see a path between the people in the social network. Recall that $\Gamma_s(G_S, G_P, J, 1)$ is defined to be the number of times there exist $s_0 \in S$ and $p_i, p_j \in P$ with $i \neq j$, such that $(p_i, s_0), (p_j, s_0) \in J$. Moreover, $\Lambda_s(G_S, G_P, J, 1)$ is defined to be the number of times there exist $s_0 \in S$ and $p_i, p_j \in P$ with $i \neq j$, such that $(p_i, s_0), (p_j, s_0) \in J$ and $(p_i, p_j) \in E_P$. The 1-path collaboration consistency measure is given by $$\rho_{s,1} := \frac{\Lambda_s(G_S, G_P, J, 1)}{\Gamma_s(G_S, G_P, J, 1)}.$$

In the following discussion, it is assumed that there exists $p_i$ with $p_i \neq p_0$ such that $(p_i, s_0) \in J$. This assumption means that every artifact in the socio-technical network has at least one person assigned to it a priori. For the sake of simplicity, first examine the case that there exists a unique $p_i \in P$ with $p_i \neq p_0$ such that $(p_i, s_0) \in J$. Now suppose that $(p_i, p_0) \notin E_P$. Then $$\Gamma_s(G_S, G_P, J(p_0, s_0), 1) = \Gamma_s(G_S, G_P, J, 1) + 1$$

and $$\Lambda_s(G_S, G_P, J(p_0, s_0), 1) = \Lambda_s(G_S, G_P, J, 1).$$

Therefore the net impact of adding the arc $(p_0, s_0)$ to J is given by $$\frac{\Lambda_s(G_S, G_P, J, 1)}{\Gamma_s(G_S, G_P, J, 1)+1} - \frac{\Lambda_s(G_S, G_P, J, 1)}{\Gamma_s(G_S, G_P, J, 1)} = \frac{-\Lambda_s(G_S, G_P, J, 1)}{\Gamma_s(G_S, G_P, J, 1)(\Gamma_s(G_S, G_P, J, 1)+1)}.$$

On the other hand, if $(p_i, p_0) \in E_P$, then $$\Gamma_s(G_S, G_P, J(p_0, s_0), 1) = \Gamma_s(G_S, G_P, J, 1) + 1$$

and $$\Lambda_s(G_S, G_P, J(p_0, s_0), 1) = \Lambda_s(G_S, G_P, J, 1) + 1$$

so the net impact of adding the arc $(p_0, s_0)$ to J is given by $$\frac{\Lambda_s(G_S, G_P, J, 1)+1}{\Gamma_s(G_S, G_P, J, 1)+1} - \frac{\Lambda_s(G_S, G_P, J, 1)}{\Gamma_s(G_S, G_P, J, 1)} = \frac{\Gamma_s(G_S, G_P, J, 1) - \Lambda_s(G_S, G_P, J, 1)}{\Gamma_s(G_S, G_P, J, 1)(\Gamma_s(G_S, G_P, J, 1)+1)}.$$

In other words, there is net impact on $\rho_{s,l}$ of adding arc $$(p_0, s_0) = \begin{cases} \frac{-\Lambda_s(G_S, G_P, J, 1)}{\Gamma_s(G_S, G_P, J, 1)(\Gamma_s(G_S, G_P, J, 1)+1)} & \text{if } (p_i, p_0) \notin E_P \\ \frac{\Gamma_s(G_S, G_P, J, 1) - \Lambda_s(G_S, G_P, J, 1)}{\Gamma_s(G_S, G_P, J, 1)(\Gamma_s(G_S, G_P, J, 1)+1)} & \text{if } (p_i, p_0) \in E_P. \end{cases}$$

The assumption on the uniqueness of $p_i$ is not realistic. Let g denote the number of distinct people $p_i$ such that $p_i \neq p_0$ and $(p_i, s_0) \in J$. Let l denote the number of those distinct people $p_i$ such that $p_i \neq p_0$, $(p_i, s_0) \in J$ and $(p_i, s_0) \in E_P$. Then there is net impact on $\rho_{s,l}$ of adding arc $$(p_0, s_0) = \frac{l\Gamma_s(G_S, G_P, J, 1) - g\Lambda_s(G_S, G_P, J, 1)}{\Gamma_s(G_S, G_P, J, 1)(\Gamma_s(G_S, G_P, J, 1)+g)}.$$

Recall that by coordination consistency meant the following: if work artifact $s_r$ has a dependency on work artifact $s_q$, and if person $p_j$ is connected to artifact $s_r$, then one expects person $p_j$ to be connected to artifact $s_q$. Recall that $\Gamma_d(G_S, G_P, J, 1)$ is defined to be the number of times that there exist $s_q, s_r \in S$, $q \neq r$, and $p_i, p_j \in P$, $i \neq j$, such that $(s_q, s_r) \in A_S$ and $(p_i, s_q), (p_j, s_r) \in J$. Moreover, $\Lambda_d(G_S, G_P, J, 1)$ is defined to be the number of times that there exist $s_q, s_r \in S$, $q \neq r$, and $p_i, p_j \in P$, $i \neq j$, such that $(s_q, s_r) \in A_S$ and $(p_i, s_q), (p_j, s_r) \in J$ and $(p_i, p_j) \in E_P$. The 1-path coordination consistency measure is given by $$\rho_{d,1} := \frac{\Lambda_d(G_S, G_P, J, 1)}{\Gamma_d(G_S, G_P, J, 1)}.$$

Now assume that there exists $s_q \in S$ with $s_q \neq s_0$ such that either $(s_q, s_0) \in A_S$ or $(s_0, s_q) \in A_S$. This assumption means that $s_0$ is not an isolated software artifact. Moreover, it is assumed that there exists $p_i \in P$ with $p_i \neq p_0$ such that $(p_i, s_q) \in J$. This assumption means that every artifact in the socio-technical network has at least one person other than $p_0$ assigned to it a priori. In the case that either of these assumptions does not hold, simply define the net impact of the addition of arc $(p_0, s_0)$ to be 0.

For the sake of simplicity, first examine the case that there exists a unique $p_i \in P$ with $p_i \neq p_0$ such that $(p_i, s_q) \in J$. Now suppose that $(p_i, p_0) \notin E_P$. Then $$\Gamma_d(G_S, G_P, J(p_0, s_0), 1) = \Gamma_d(G_S, G_P, J, 1) + 1$$

and $$\Lambda_d(G_S, G_P, J(p_0, s_0), 1) = \Lambda_d(G_S, G_P, J, 1).$$

Therefore the net impact of adding the arc $(p_0, s_0)$ to J is given by $$\frac{\Lambda_d(G_S, G_P, J, 1)}{\Gamma_d(G_S, G_P, J, 1)+1} - \frac{\Lambda_d(G_S, G_P, J, 1)}{\Gamma_d(G_S, G_P, J, 1)} = \frac{-\Lambda_d(G_S, G_P, J, 1)}{\Gamma_d(G_S, G_P, J, 1)(\Gamma_d(G_S, G_P, J, 1)+1)}.$$

On the other hand, if $(p_i, p_0) \in E_P$, then $$\Gamma_d(G_S, G_P, J(p_0, s_0), 1) = \Gamma_d(G_S, G_P, J, 1) + 1$$

and $$\Lambda_d(G_S, G_P, J(p_0, s_0), 1) = \Lambda_d(G_S, G_P, J, 1) + 1$$

so the net impact of adding the arc $(p_0, s_0)$ to J is given by $$\frac{\Lambda_d(G_S, G_P, J, 1)+1}{\Gamma_d(G_S, G_P, J, 1)+1} - \frac{\Lambda_d(G_S, G_P, J, 1)}{\Gamma_d(G_S, G_P, J, 1)} = \frac{\Gamma_d(G_S, G_P, J, 1) - \Lambda_d(G_S, G_P, J, 1)}{\Gamma_d(G_S, G_P, J, 1)(\Gamma_d(G_S, G_P, J, 1)+1)}.$$

In other words, there is net impact on $\rho_{d,l}$ of adding arc $$(p_0, s_0) = \begin{cases} \dfrac{-\Lambda_d(G_S, G_P, J, 1)}{\dfrac{\Gamma_d(G_S, G_P, J, 1)}{(\Gamma_d(G_S, G_P, J, 1) + 1)}} & \text{if } \exists\, s_q \in S, s_q \neq s_0 \text{ such that} \\ & (s_q, s_0) \in A_S \text{ or } (s_0, s_q) \in A_S \text{ and} \\ & \exists!\, p_i \in P, p_i \neq p_0 \text{ so that} \\ & (p_i, s_q) \in J \text{ and } (p_i, p_0) \notin E_P, \\ \Gamma_d(G_S, G_P, J, 1) - & \\ \dfrac{\Lambda_d(G_S, G_P, J, 1)}{\dfrac{\Gamma_d(G_S, G_P, J, 1)}{(\Gamma_d(G_S, G_P, J, 1) + 1)}} & \text{if } \exists\, s_q \in S, s_q \neq s_0 \text{ such that} \\ & (s_q, s_0) \in A_S \text{ or } (s_0, s_q) \in A_S \text{ and} \\ & \exists!\, p_i \in P, p_i \neq p_0 \text{ so that} \\ & (p_i, s_q) \in J \text{ and } (p_i, p_0) \notin E_P, \\ 0 & \text{if } \forall\, s_q \in S, (s_q, s_0), (s_0, s_q) \notin A_S, \\ 0 & \text{if } \exists\, s_q \in S, s_q \neq s_0 \text{ such that} \\ & (s_q, s_0) \in A_S \text{ or } (s_0, s_q) \in A_S \text{ but} \\ & \forall\, p_i \in P, \text{ either } p_i = p_0 \text{ or } (p_i, s_q) \neq J. \end{cases}$$

The assumption on the uniqueness of $p_i$ is not realistic. Let $g$ denote the number of distinct people $p_i$ such that $p_i \neq p_0$ and $(p_i, s_q) \in J$. Let $l$ denote the number of those distinct people $p_i$ such that $p_i \neq p_0$, $(p_i, s_q) \in J$, and $(p_i, p_0) \in E_P$. Then there is net impact on $\rho_{d,l}$ of adding arc $$(p_0, s_0) = \begin{cases} \dfrac{l\Gamma_d(G_S, G_P, J, 1) - \dfrac{g\Lambda_d(G_S, G_P, J, 1)}{\Gamma_d(G_S, G_P, J, 1)}}{(\Gamma_d(G_S, G_P, J, 1) + g)} & \text{if } \exists\, s_q \in S, s_q \neq s_0 \text{ such that} \\ & (s_q, s_0) \in A_S \text{ or } (s_0, s_q) \in A_S \\ & \text{and } \exists\, p_i \in P, p_i \neq p_0 \text{ so that } (p_i, s_q) \in J \\ 0 & \text{if } \forall\, s_q \in S, (s_q, s_0), (s_0, s_q) \notin A_S, \\ 0 & \text{if } \exists\, s_q \in S, s_q \neq s_0 \text{ such that} \\ & (s_q, s_0) \in A_S \text{ or } (s_0, s_q) \in A_S \\ & \text{but } \forall\, p_i \in P, \text{ either } p_i = p_0 \text{ or } (p_i, s_q) \notin J. \end{cases}$$

Once a score for all component links have been established using a process such as the one described above, then each component link can also be assigned a ranking, for example, by ordering either in ascending or descending order, depending on the application. As an example, the list of component links and their scores may be sorted into descending order. The component link with the largest score is given the rank of 1, the next highest is given rank 2, and so on. Component links with identical (i.e. tied) scores may be assigned the same (equal) rank. A step in the ranking may or may not be skipped when there are ranking ties.

Different from the weights considered to combine consistency measurements, described in the equations previously, there may be weights assigned to component links and nodes that are used in computations of the component link scores. These weights may be associated with attributes of the component links and nodes. For example, a component node that represents a software artifact may have an associated complexity measurement, such as "cyclomatic complexity" developed by Thomas McCabe (reference IEEE Transactions On Software Engineering, Vol. SE-2, No. 4, December 1976, pp 308-320 by Thomas McCabe). Many other examples of complexity metrics, general metrics, and other attributes exist. These node attributes may be considered as weights that impact the scores. For example, if a component link connects two people who both happen to work on the same artifact and the artifact happens to have a higher weight, then the component link score may be bumped up proportionally, for example, considering the value of the weight in the overall collection of weights.

The method and system of the present disclosure in one embodiment provides mechanism for quantifying alignments or gaps between working groups and their work product and/or any other work factors. The quantification can be used to re-align the work group structure and/or the work product structure, for example, to improve an overall outcome, for instance, for more productive collaborative development.

While the examples shown above were related to sociotechnical graphs involving software development, the method and system may be applied in any other development and design project, including but not limited to hardware, system, manufacturing, etc. Further, the method and system of the present disclosure may be used in general graph comparison, not limited to socio-technical graphs.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A computer implemented method of scoring a plurality of component links in a socio technical system having a plurality of components representing people and objects, the plurality of component links representing a plurality of relationships between the plurality of components, comprising:

determining, by a processor, a measure of consistency relative to a network of people components and a network of object components in a socio technical system, the network of people components including components representing people and one or more links between the components representing people, and the network of object components including components representing objects worked on by at least some of the components representing people and one or more links between the components representing objects; and determining a measure of contribution of one or more links between said components, contributing to the measure of consistency, based on presence or absence of said one or more links in the social technical system, the measure of consistency including a measure of collaboration consistency or a measure of coordination consistency or combinations thereof, the collaboration consistency representing an expectation that whenever a pair of people represented in the network of people components both have a relationship with an artifact represented in the network of object components, then there is a path between the pair of people, and the coordination consistency representing an expectation that if artifact r has a dependency on artifact q, and if person j is connected to artifact r , then person j is connected to artifact q, wherein the artifact r and artifact q are components in the network of object components and person j is a component in the network of people components, the measure of collaboration consistency computed as $$\rho_{s,k} := \frac{\Lambda_s(G_S, G_P, J, k)}{\Gamma_s(G_S, G_P, J, k)}.$$

wherein $\Gamma_s(G_S, G_P, J, k)$ represents the number of times that there exist $s_0 \in S$ and $p_i, p_j \in P$, with $i \neq j$, such that $(p_i, s_0)$, $(p_j, s_0) \in J$ and there is no geodesic from $p_i$ to $p_j$ of length less than or equal to k−1 for k>=2, $\Lambda_s(G_S, G_P, J, k)$ denote the number of times that there exist $s_0 \in S$ and $p_i$, $p_j \in P$, with $i \neq j$, such that $(p_i, s_0)$, $(p_j, s_0) \in J$ and there is a geodesic from $p_i$, to $p_j$ of length less than or equal to k for k>=2, and the measure of coordination consistency computed as $$\rho_{d,k} := \frac{\Lambda_d(G_S, G_P, J, k)}{\Gamma_d(G_S, G_P, J, k)}$$

wherein let $\Lambda_d(G_S, G_P, J, k)$ denote the number of times that there exist $s_q, s_r \in S$, $q \neq r$, and $p_i, p_j \in P$, $i \neq j$, such that $(s_q, s_r) \in A_S$ and $(p_i, s_q)$, $(p_j, s_r) \in J$ and there is a geodesic from $p_i$, to $p_j$ of length k for k>=2, wherein P represents a set of people, indexed $p_1, p_2, \ldots, p_n$, S represents a set of work product artifacts, indexed $s_1$, $s_2, \ldots, s_m$, As represents dependencies between work products.

2. The method of claim 1, wherein the step of determining a measure of consistency includes determining a measure of consistency relative to two or more people in the network of people components working on a same object in the network of object components.

3. The method of claim 1, wherein the step of determining a measure of consistency includes determining a measure of consistency relative to two or more people in the network of people components each working on an object and dependencies between said each object.

4. The method of claim 1, wherein the step of determining a measure of consistency further includes aggregating said measure of consistency determined for all components and component links in the socio-technical system to determine a system level measure of consistency.

5. The method of claim 1, wherein the step of determining a measure of contribution includes:
identifying patterns and anti-patterns within the plurality of components based on a set of expected patterns in relationships between the plurality of components in the socio technical system; and
assigning a measure of contribution to each of said plurality of component links based on said identified patterns and anti-patterns.

6. The method of claim 1, further including:
identifying a weighing factor for said one or more links between said components, the weighing factor being dependent on a degree to which expected links exist;
adjusting the measure of contribution for said one or more links between said components based on the identified weighing factor.

7. The method of claim 1, further including:
identifying a weighing factor for each of said component links, the weighing factor being dependent on an estimation of complexity of joining nodes;
adjusting the measure of contribution based on the identified weighing factor.

8. The method of claim 1, further including:
identifying a weighing factor for each of said component links, the weighing factor being dependent on one or more attributes of one or more adjoining components; and;
adjusting the measure of contribution based on the identified weighing factor.

9. The method of claim 1, further including:
determining the measure of contribution for each of the plurality of component links; and
ranking the measure of contribution.

10. The method of claim 1, further including:
determining a measure of consistency, measure of contribution, and rank for one or more subsets of components in the socio technical network.

11. The method of claim 1, further including:
identifying one or more component link gaps between one or more components;
determining an impact of filling said one or more component link gaps.

12. The method of claim 1, further including:
identifying one or more component link gaps between one or more components;
determining an importance factor associated with said one or more component link gaps.

13. The method claim 1, wherein the step of determining a measure of consistency includes:
identifying expected patterns in relationships between people components based on relationships between one or more object components;
observing actual patterns in relationships between people components; and
determining a measure of consistency based on said expected patterns and said actual patterns.

14. The method of claim 1, further including:
selecting a component link from a plurality of component links, the plurality of component links being edges making up the network of people components and the network of object components;
assigning a score to the selected link based on one or more scores of a subset of other links and components; and
processing said component link according to the score.

15. The method of claim 14, wherein the processing step includes ranking said component links according to their scores.

16. The method of claim 14, wherein the processing step includes presenting said component links according to their scores.

17. The method of claim 14, further including:
- generating an initial estimate of a rank for each of the component links;
- updating the estimate of a rank for each of the component links using analytics derived from a reference pattern, the reference pattern including expected links among the components; and
- processing the component links according to the respective updated ranks.

18. A system for scoring a plurality of component links in a socio technical system having a plurality of components representing people and objects, the plurality of components links representing a plurality of relationships between the plurality of components, comprising:
- a processor;
- a module operable to run on the processor for determining a measure of consistency relative to a network of people components and a network of object components in a socio technical system, the network of people components including components representing people and one or more links between the components representing people, and the network of object components including components representing objects worked on by at least some of the components representing people and one or more links between the components representing objects; and
- the module further for determining a measure of contribution of one or more links between said components, contributing to the measure of consistency for one or more links between said components, based on presence or absence of said one or more links in the social technical system,
- the measure of consistency including a measure of collaboration consistency or a measure of coordination consistency or combinations thereof,
- the collaboration consistency representing an expectation that whenever a pair of people represented in the network of people components both have a relationship with an artifact represented in the network of object components, then there is a path between the pair of people, and
- the coordination consistency representing an expectation that if artifact r has a dependency on artifact q, and if person j is connected to artifact r, then person j is connected to artifact q, wherein the artifact r and artifact q are components in the network of object components and person j is a component in the network of people components,
- wherein the measure of collaboration consistency is computed as $$\rho_{s,k} := \frac{\Lambda_s(G_S, G_P, J, k)}{\Gamma_s(G_S, G_P, J, k)}.$$

wherein
$\Gamma_s(G_S, G_P, J, k)$ represents the number of times that there exist $s_0 \in S$ and $p_i, p_j \in P$, with $i \neq j$, such that $(p_i, s_0)$, $(p_j, s_0) \in J$ and there is no geodesic from $p_i$ to $p_j$ of length less than or equal to k−1 for k>=2, $\Lambda_s(G_S, G_P, J, k)$ denote the number of times that there exist $s_0 \in S$ and $p_i, p_j \in P$, with $i \neq j$, such that $(p_i, s_0), (p_j, s_0) \in J$ and there is a geodesic from $p_i$, to $p_j$ of length less than or equal to k for k>=2,
and wherein the measure of coordination consistency is computed as $$\rho_{d,k} := \frac{\Lambda_d(G_S, G_P, J, k)}{\Gamma_d(G_S, G_P, J, k)}$$

wherein
let $\Lambda_d(G_S, G_P, J, k)$ denote the number of times that there exist $s_q, s_r \in S$, $q \neq r$, and $p_i, p_j \in P$, $i \neq j$, such that $(s_q, s_r) \in A_S$ and $(p_i, s_q), (p_j, s_r) \in J$ and there is a geodesic from $p_i$, to $p_j$ of length k for k>=2,
wherein P represents a set of people, indexed $p_1, p_2, \ldots, p_n$, S represents a set of work product artifacts, indexed $s_1, s_2, \ldots, s_m$,
As represents dependencies between work products.

19. The system of claim 18, wherein the module is further operable for ordering said measure of contribution determined for the plurality of component links into ranks.

20. The system of claim 18, wherein the network of people components are represented in a socio plane and the network of object components are represented in a technical plane of the socio technical system.

* * * * *